United States Patent [19]

Yamawaki et al.

[11] Patent Number: 4,661,570

[45] Date of Patent: Apr. 28, 1987

[54] METHOD OF CONTINUOUS POLYMERIZATION

[75] Inventors: Masami Yamawaki; Shuichi Chino, both of Fuji; Tsuyoshi Minamisawa, Mishima; Masaaki Nakamura, Fuji, all of Japan

[73] Assignee: Polyplastics Co., Ltd., Osaka, Japan

[21] Appl. No.: 853,096

[22] Filed: Apr. 17, 1986

[30] Foreign Application Priority Data

Apr. 17, 1985 [JP] Japan ................................. 60-81697

[51] Int. Cl.$^4$ ............................................... C08F 2/02
[52] U.S. Cl. ...................................................... 526/88
[58] Field of Search .......................................... 526/88

[56] References Cited

U.S. PATENT DOCUMENTS 3,538,067 11/1970 Bognar ................................... 526/88
4,383,093 5/1983 Shiraki ................................... 526/88

Primary Examiner—Paul R. Michl

Attorney, Agent, or Firm—Robert M. Shaw; Michael W. Ferrell

[57] ABSTRACT

A solid polymerization product is continuously produced from a liquid stock by employing a continuous agitator-mixer type reactor including two parallel shafts rotatable in same direction or in opposite directions, a multiplicity of paddles mounted on each of the shafts, and a barrel with its inner periphery proximate to the outer peripheries of the paddles, said paddles being arranged so that the major axis end of each paddle on one of the shafts is allowed to periodically come close to the minor axis ends of a corresponding paddle on the other shaft, said reactor being such that feed stock is charged from an inlet port provided at one end of the longitudinal of the reactor and polymerization product is discharged from an outlet port provided at the other end, said method of continuous polymerization being characterized in that the rear-side portion of the reactor including the outlet port is raised so that the major axis of the reactor has a slope angle of 1°–10° relative to the horizontal, whereby reaction is allowed to take place in the reactor as installed in such inclined state.

10 Claims, 4 Drawing Figures (1) COMPARATIVE EXAMPLE ($\theta = 0°$)

(2) EXAMPLE 1 ($\theta = 1°$)

(3) EXAMPLE 3 ($\theta = 3°$)

(4) EXAMPLE 5 ($\theta = 5°$)

DIRECTION OF PROGRESS (NOS. OF PADDLES)

METHOD OF CONTINUOUS POLYMERIZATION

TECHNICAL FIELD

The present invention relates to a method of polymerization for continuously producing a polymerization product in fine particle form from a substantially liquid-form stock.

More specifically, the invention relates to a method of continuous polymerization for producing a solid polymerization product in fine particle form from a liquid stock in a so-called continuous agitatormixer type polymerization reactor including two parallel shafts rotatable in same direction or in opposite directions, a multiplicity of paddles mounted on each of the shafts, and a barrel with its inner periphery proximate to the outer peripheries of the paddles, characterized in that the rear-side portion of the reactor including an outlet port is raised so that the major axis of the reactor has a slope angle of 1°-10° relative to the horizontal, whereby reaction is allowed to take place in the reactor as installed in such inclined state.

BACKGROUND OF INVENTION

Generally, where polymerizable liquid monomers are polymerized in the presence of a suitable polymerizing catalyst, there are two different cases, namely, one wherein the polymeric mass produced is soluble in the monomers and therefore the mass forms a viscous liquid mass, which in turn is caused to form a highly viscous material as polymerization progresses, and the other wherein the polymeric mass is insoluble in the monomers and accordingly, as polymerization progresses, there occurs a change of phase such that the mass undergoes a change from liquid state into slurry state before it is finally separated out in the form of a completely solid polymerization product. The invention relates to a system of the latter case. A typical example of continuous manufacture of a solid polymerization product through such polymerization reaction as involved in the latter case is polyvinyl chloride production through bulk polymerization, and another is polyacetal resin production through bulk polymerization In the following description, therefore, a method of manufacturing polyacetal resin is mainly taken up.

It is already known to produce a polyacetal resin by using such cation active polymerizing catalysts as boron trifluoride, phosphorus pentafluoride, tin tetrachloride, perchloric acid, or salts thereof or complex salt and through monopolymerization of trioxane or through copolymerization with cyclic ethers such as trioxane and ethylene oxide, or with cyclic formal or the like. Such method is in actual practice on an industrial scale. In the process of such polymerization or copolymerization, as already stated, so-called phase change takes place as polymerization progresses, so that the polymeric mass changes into a solid polymeric mass via a short period of its slurry state. Further, in a so-called bulk polymerization method wherein virtually no diluent is present, reaction is so fast that the phase change is very abrupt; hence, it is no easy task to control the reaction. For example, if such polymerization or copolymerization reaction is carried out in static condition, a large bulky and tough product is produced in an instantaneously short time, so that material handling in the subsequent crushing, cleaning, and refining stages is extremely difficult. Moreover, because of internally accumulated polymerization heat, temperature control is almost impossible, with the result of quality deterioration and unfavorable rate of conversion. Therefore, in view of such specific aspect of reaction and in order to prevent formation of such bulky polymerization product and to allow efficient production of a fine-particle polymerization product which is comparatively quality-stable, a number of approaches have been proposed. One basic concept common to those approaches is utilization of an extruder type polymerization reactor having a two-parallel-shaft agitator arrangement.

The concept of utilizing such extruder type reactor having a two-parallel-shaft agitator construction for the purpose of manufacturing polyacetal resins, pioneered by a proposal to use a two-shaft screw type extruder as disclosed in Japanese Published Examined patent Application Nos. 47-629 and 47-42145, and a proposal to employ a two-shaft mixer consisting of a combination of screws and elipsoidal disc paddles, with subsequent development and improvements, led to a number of proposals including Japanese Published Unexamined patent application Nos. 53-86794, 56-38313, and 58-32619 - 21. There are two types, one such that the parallel two shafts rotate in same direction and the other such that the shafts rotate in opposite (different) directions, both having similar functions. The former type is claimed as having good self-cleaning characteristics; and in the area of the latter type, there has been proposed an arrangement such that shear force is variably effected automatically in a desired direction according to the phase change, as disclosed in Japanese Published Unexamined patent application. At present, manufacturing techniques employed for industrial production of polyacetal resin are largely based on said proposal.

Recently, the demand for polyacetal resins has been constantly on the increase, and in view of the fact that high quality is demanded of the resin in thermal stability characteristics in particular, the state of the art for production process is not always satisfactory. Further efforts are desired for improvement of polymerization product yield or conversion rate per unit of equipment, and also for improvement in quality of polymerization products through more effective stabilization treatment. When a two-parallel-shaft rotary agitator type reactor incorporating various features based on aforesaid inventive proposals, with modified paddle configuration and arrangement, is employed in producing polyacetal resins, it is indeed possible to obtain a polymerization product of a relatively fine particle form at a high conversion rate, if the equipment is of a small type of laboratory scale. However, as the size of the installation becomes larger, results obtained are not necessary satisfactory. For example, a polymerization product of coarse-particle size, e.g., small-finger size, rather than fine-particle size, is produced in a larger proportion. Further, a thicker scale of polymeric matter is likely to deposit on the inner wall of the equipment, thus causing a decrease in heat transfer efficiency, which inevitably results in decreased conversion rate and lower product quality. In such case, the polymerization product from the reactor is often ground and refined by a grinder, and then led to a so-called quenching stage in which it is subjected to stabilization treatment, such as cleaning, under good cooling condition, before the product enters the subsequent stage. Where operation is carried out continuously, masses of polymeric product being continuously turned out involve considerable fluctuations in quality and furthermore the flow in the process of polymeric masses converted from the stock is subject to considerable pulsation; therefore, attempts to control reaction are not always effective to the satisfaction of the accuracy requirements.

The functions required of a two-shaft agitator type reactor of the kind include:

(a) fast and homogeneous blending of catalysts and polymerizable monomers, i.e., trioxane or cyclic compound monomers copolymerizable with trioxane;

(b) prevention of polymeric particle adhesion at an initial stage where a polymeric product is separated out as polymerization initiates, that is, at a stage where the polymeric product is in slurry condition (high shear force);

(c) prevention of solid polymeric product from bulking, or grinding of bulk polymeric product (high shear force);

(d) retention of within-reactor self-cleaning characteristics (prevention or removal of deposit retention);

(e) retention of good efficiency of heat transfer to fine-particle polymerization product (retention of the specified polymerization temperature, relaxation or reduction of reaction temperature internal build-up); and (f) prevention of product flow from pulsation throughout the process of from stock introduction and to product discharge.

Even if various improvements are made in paddle configuration and/or paddle arrangement, it is practically impossible that all these requirements are fully satisfied within one reactor. The reason for aforesaid difficulty of sealing up reactors of the type lies in this point. More especially, it must be noted that phase change from the liquid to the solid is abrupt because the speed of polymerization reaction is very fast, from which fact it follows that the density change involved is considerable and that the reactor contents also undergo considerable volumetric change. As a result of such phenomena, the fill level of reactor contents varies locally in the axial direction; therefore, pulsation is caused to the flow of product, which leads to fluctuations in agitation or grinding efficiency, and ultimately to a lower conversion rate and lower product quality. In order to overcome these problems, measures are often taken to regulate the flow by adopting a suitable combination of "feed" type and "reverse (back feed)" type paddles in paddle arrangement. However, such approach may often involve troubles, such as excessive power consumption, overloading, and reactor content blocking, during operation, and is not always useful for adequate regulation purposes. In Japanese Published Unexamined patent application No. 53-86794, it is proposed to divide the polymerization process into two stages, that is, a first stage in which a self-cleaning type reactor is employed, and a second stage in which a pin-mixer type heat-exchange reactor is employed. However, the proposal gives no basic measure for overcoming the difficulties involved in the first-stage reactor.

SUMMARY OF INVENTION

From the aforesaid view points, the present inventors directed their research efforts toward improving the operating characteristics of a parallel two-shaft agitator-mixer type polymerization reactor and achieving efficient production of polymerization products in fine particle form, and as a result they arrived at the present invention. Accordingly, the invention provides a method of continuous polymerization for producing a solid polymerization product from a liquid stock by employing a so-called continuous agitator-mixer type reactor including two parallel shafts rotatable in same direction or in opposite directions, a multiplicity of paddles mounted on each of the shafts, and a barrel with its inner periphery proximate to the outer peripheries of the paddles, said paddles being arranged so that the major axis end of each paddle on one of the shafts is allowed to periodically come close to the minor axis end of a corresponding paddle on the other shaft, said reactor being such that feed stock is charged from an inlet port provided at one end of the longitudinal of the reactor and polymerization product is discharged from an outlet port provided at the other end, said method of continuous polymerization being characterized in that the rear-side portion of the reactor including the outlet port is raised so that the major axis of the reactor has a slope angle of 1°–10° relative to the horizontal, whereby reaction is allowed to take place in the reactor as installed in such inclined state. Hitherto, it has been an established concept that a two-shaft rotary agitator-mixer type reactor should be operated in a level condition, but the present invention, unprejudiced by such fixed idea, was made under an entirely new and novel concept which led to the finding of the features characterizing the invention.

That is, the method of the invention is characterized in that the reactor is installed with its axis inclined at a certain angle or more to the horizon. This arrangement permits satisfactory polymerization control during continuous operation of the reactor: discharge variations can be minimized; polymerization reaction can be stabilized, with reduced internal temperature fluctuations; conversion rates for polymerization products can be improved, with reduced conversion fluctuations.

If the slope angle of the reactor is less than 1°, no sufficient advantage of the invention may be obtained. If the slope angle is more than 10°, the mechanism which supports the rotatable shafts and provides rotation power is subject to considerable load, so that troubles may be encountered during any prolonged operation; further, difficulties may arise in conjunction with hermetic maintenance of gland seals. Therefore, such high slope angle is not practical. In order to obtain good operating efficiency and to take good advantage of the invention, a preferred range of slope angles is 1°–5°.

For paddles mounted on the rotatable shafts in the reactor according to the invention, any known type of paddle may be used without particular limitation. By way of example, several sectional paddle configurations (sections perpendicular to the agitator shafts) are shown in FIG. 3. Various types of paddles, such as so-called convex lens-type, elipsoid-type, and quasi-triangle, or those types provided at front end with some notch or saw-tooth feature for scraper effect, may be employed according to the circumstance or condition involved. It is also possible to use eccentric disc type or eccentrically transformed disc type paddles. In effect, these types of paddles may be suitably selected and suitably arranged in combination according to the polymerization condition or aspect involved. Rather, one feature of the invention lies in the fact that such suitable combinations can be broadly selected.

For the two parallel shaft agitator type reactor employed in the method of the invention, it is desired that it can be industrially manufactured at low cost, and that the clearance between the front end of each paddle and the inner periphery of the barrel is less than 2%, preferably less than 1%, of the circumcircle diameter of the paddle and is free of variation or deviation due to major axis deformation. If consideration is taken of both machining accuracy and operational safety, L/D (where L is the length of the reactor, and D is the inner diameter thereof) should normally be less than 20, or preferably less than 15. On the other hand, if sufficient conversion is to be attained, L/D should preferably be more than 5. In order to obtain the desired fine-particle polymerization product, it is desired that the rotational speed of the agitator shafts should be within the range of 0.1-1.0 m/sec in terms of peripheral speed at the front edge of the paddle. In the method of the invention, however, the desired product can be effectively obtained even if the speed is less than 0.1 m/sec. Referring to the direction of rotation of the two shafts, two cases may be considered, i.e., rotation in same direction and rotation in opposite directions, as earlier mentioned; and the method of the invention may be equally applied in either case.

As already stated, the invention relates to a polymerization method for producing a solid polymerization product from a liquid stock, or in other words, a polymerization method of such system that the polymeric masses are insoluble in the material monomers and that a completely solid polymerization product is separated out as polymerization progresses. As far as such system is concerned, the method of the invention can be widely applied. More preferably, the method is employed for the purpose of polymerizing vinyl chloride, or homopolymerizing or copolymerizing trioxane. In the case of trioxane copolymerizing, there is no particular limitation as to copolymerizable monomers in a system wherein trioxane is contained as a principal ingredient in an amount of more than 50 mol%. Nor is there any limitation on the polymerizing catalyst to be used. Needless to say, a small amount of anhydrous inert solvent or molecular-weight regulator, or other additive may be effectively used.

Advantages of the invention are apparent from what has been described above. To sum up, unlike the conventional method which employs a two-shaft rotary agitator type reactor installed in level position, the method of the invention employs such reactor installed with a suitable slope angle to the horizon. Superficially, the mechanical arrangement employed in the invention may be similar to the one conventionally employed; however, the arrangement is advantageous in that it permits the fill rate of reactor contents to be readily kept constant in the direction of the major axis, in that the fill level can be readily adjusted, and in that any abrupt phase change or volumetric change can be readily relaxed, there being no possibility of substantial fluctuation in agitation efficiency. Indeed, the invention is based on a novel and unique concept as evidenced by these amazingly good improvements in reactor functions. According to the continuous polymerization method of the invention, continuous polymerization reaction can be steadily carried out even where a large-scale reactor is employed, and thus polymerization products of good and uniform quality can be obtained in the form of particle mass of a desired configuration and size and at a high yield.

BRIEF DESCRIPTION OF DRAWINGS

Examples of the method of the invention will now be described with rerence to the drawings wherein like numerals designate similar parts.

In the drawings.

DETAILED DESCRIPTION

Figure 1:
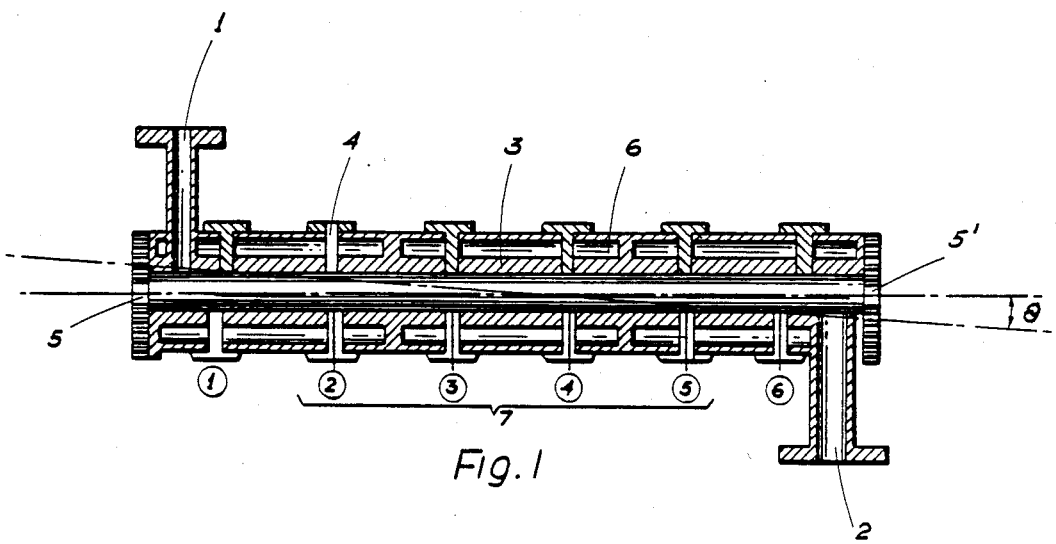
FIG. 1 is a longitudinal section of a reactor of the class useful in practicing the inventive method.
Figure 2:
FIG. 2 illustrates paddle arrangements which may be used in connection with the reactor of FIG. 1.
Figure 3:
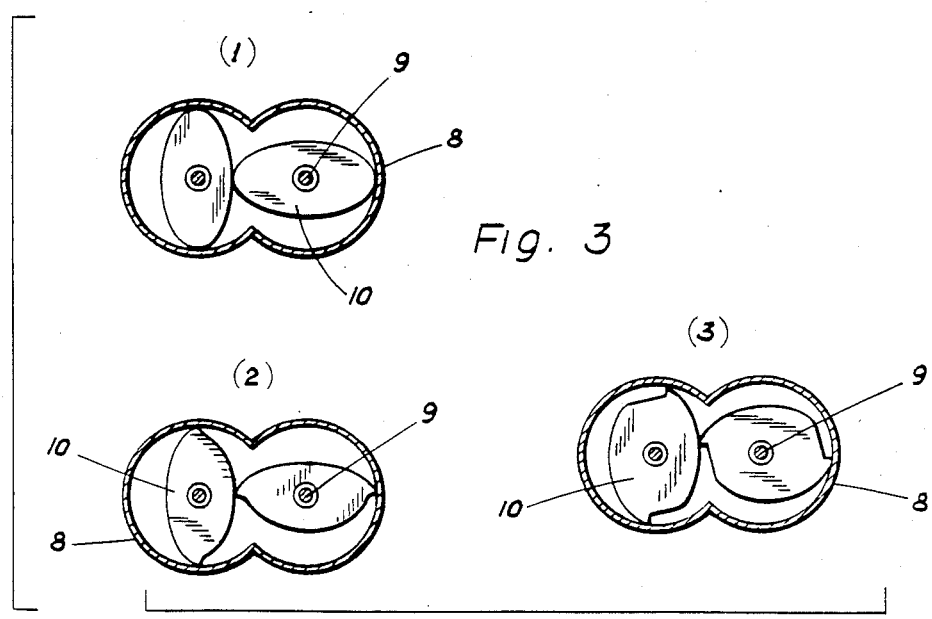
FIG. 3 details alternate paddle designs.

By employing a two-shaft agitator type continuous polymerization reactor as shown in FIG. 1, with paddles having such sectional configuration as shown in FIG. 3(1) and arranged in such pattern as shown in FIG. 2, and under such common reaction conditions as described hereinafter, experiments were conducted for a number of cases with slope angle $\theta$ varied from case to case, namely, 0° (Comparative Example), 1°, 2°, 3°, and 5° (Examples 1, 2, 3, and 4). Needles to say, the interior of the reactor was thoroughly cleaned prior to the start of operation for each example.

In FIG. 1, numeral 1 is a stock inlet port, 2 is a product outlet port, 3 is a barrel body, 4 is a polymerizing catalyst inlet port, and 5 and 5' are bearings for the two shafts. Numeral 6 is a jacket surrounding the outer periphery of the barrel and divided into three sections. Shown by 7 are thermocouples mounted at temperature measuring junctions 1–6. (There is no limitation as to the number and locations of thermocouples, of course.) It is noted that $\theta$ denotes an angle which the axis makes with the horizon.

FIG. 2 is a schematic illustration of types of paddles and one example of their arrangement corresponding to FIG. 1; in the figure, each rectangle expresses a pair of paddles having a convex lenslike section without twist, and each rectangle with an oblique line denotes a pair of forward feed paddles (shown by ▱) or a pair of backward feed paddles (shown by ▱), as the case may be. Numerals at the bottom denote numbers of paddles counted from the inlet port.

A stock consisting of trioxane monomers mixed with 2.5% of ethylene oxide and 500 ppm of methylal as a regulator was introduced through the inlet port at a per-hour rate of 10 parts by weight, and a polymerizing catalyst consisting of a cyclohexane solution of boron trifluoride and dibutyl etherate was introduced through the catalyst inlet port 4 at a rate equivalent to 34 ppm relative to the polymerizable monomers. Oil heated to 90° C. was circulated through the jacket 6 for heating the reactor, and the rotational speed of the two shafts was maintained at 50 rpm.

Polymerization products as discharged from the outlet port 2 were sampled from time to time for measurement of their detention time, discharge rate, degree of conversion, and polymerization product melt index (MI). Variations in the measurements were examined. Also, internal temperature changes were recorded.

Figure 4:
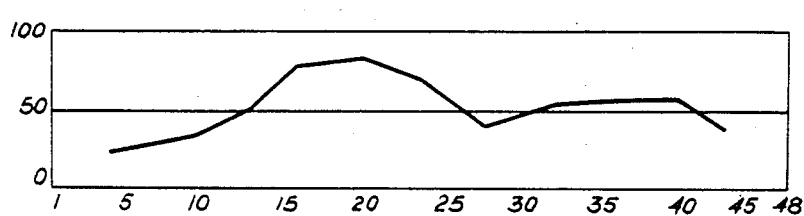
FIG. 4 shows for various slope angles of a reactor the relationship between fill level and axial position.
Figure 4:
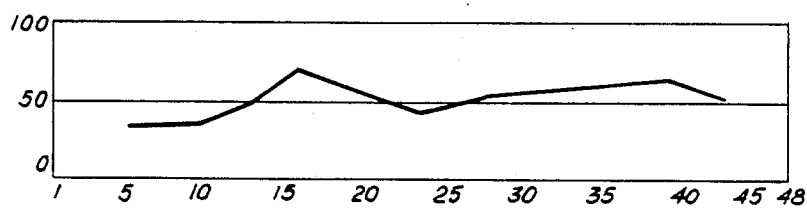
Figure 4:
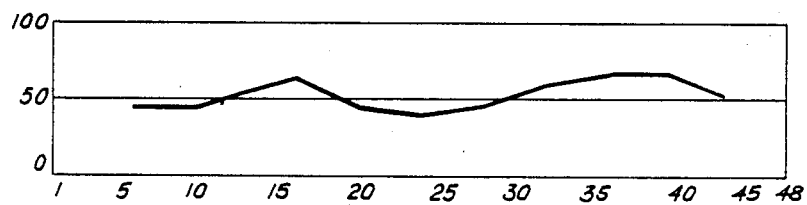
Figure 4:
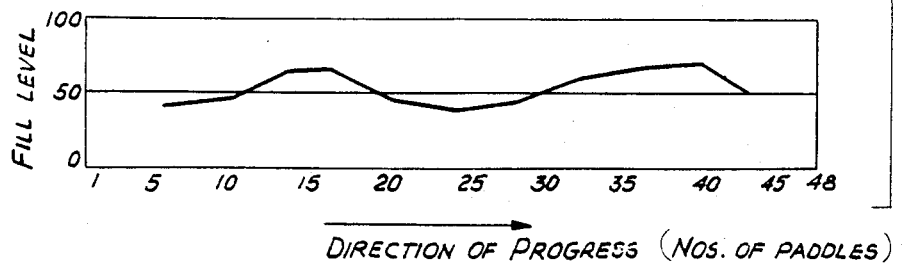

Meanwhile, in the individual examples and comparative example, reaction was suspended after some 3–4 hours of operation and fill levels of contents in the reactor were examined. Results of these measurements are shown together in Table 1 and FIG. 4.

TABLE 1

| | Comp. example | Example 1 | Example 2 | Example 3 | Example 4 |
|---|---|---|---|---|---|
| Slope angle $\theta°$ | 0 | 1 | 2 | 3 | 5 |
| Detention time (min) | 6.5~8.3 | 8.0 | 8.1 | 7.7 | 8.3 |
| MI of polymerization product | 5.2~8.3 | 4.6~5.1 | 4.5~4.6 | 4.2~5.1 | 4.6~5.2 |
| Degree of conversion (%) | 62.2~66.8 | 74.4~77.3 | 78.0~78.1 | 76.2~78.4 | 78.2~79.3 |
| Variations in conversion ($\delta/\bar{x} \times 100$) (%) | 4~6 | 1.9 | 1.7 | 1.3 | 1.3 |
| Temperature variations (at measuring junction 2 in FIG. 1) (°C.) | 1.4~1.7 | 1.2~1.6 | 1.2 | 0.5~0.7 | 0.5~0.6 |
| Variations in discharge rate ($\delta/\bar{x} \times 100$) (%) | >20 | 8~11 | 7~8 | 8~9 | 10 |

$\bar{x}$: mean value
$\delta$: standard deviation

As is apparent from Table 1, it has been confirmed that by operating the reactor as installed with a certain slope angle or more it is possible to reduce discharge variations significantly, statilize polymerization reactor, minimize internal temperature fluctuations, attain improved conversion into polymerization product, with reduced variation therein, and further to stabilize the M1 of polymerization product at a low level. Again, as can be seen from FIG. 4, it has been found that by placing the reactor at an angle of inclination to the horizon the fill rates of contents in the reactor can be equalized, which fact may be taken as an evidence supporting the Table 1 data.

Little deposit, if any, was found present on the inner wall of the reactor; and the polymerization product was of a fine particle size of the order of less than 2 mm dia., with a minor proportion of particles of not more than 3 mm dia.

The embodiments of the invention in which an exclusive property or privilege is claimed are defined as follows:

1. A method of continuous polymerization for continuously producing a solid polymerization product from a liquid stock by employing a continuous agitator-mixer type reactor including two parallel shafts rotatable in same direction or in opposite directions, a multiplicity of paddles mounted on each of the shafts, and a barrel with its inner periphery proximate to the outer peripheries of the paddles, said paddles being arranged so that the major axis end of each paddle on one of the shafts is allowed to periodically come close to the minor axis end of a corresponding paddle on the other shaft, said reactor being such that feed stock is charged from an inlet port provided at one end of the longitudinal of the reactor and polymerization product is discharged from an outlet port provided at the other end, said method of continuous polymerization being characterized in that the rear-side portion of the reactor including the outlet port is raised so that the major axis of the reactor has a slope angle of 1–10 degrees relative to the horizontal, whereby reaction is allowed to take place in the reactor as installed in such inclined state.

2. The method of continuous polymerization as set forth in claim 1 wherein the liquid stock is trioxane or a mixed liquid composed of trioxane as a principal ingredient and a copolymer which is copolymerizable therewith, and wherein the solid polymerization product is a trioxane polymer or trioxane copolymer.

3. The method of continuous polymerization as set forth in claim 1, wherein said slope angle is from about 1 to about 5 degrees relative to the horizontal.

4. The method of continuous polymerization as set forth in claim 3 wherein said slope angle is about 1 degree relative to the horizontal.

5. The method of continuous polymerization according to claim 3 wherein said slope angle is about 3 degrees relative to the horizontal.

6. The method of continuous polymerization as set forth in claim 3 wherein said slope angle is about 5 degrees relative to the horizontal.

7. The method of continuous polymerization as set forth in claim 1, wherein the degree of conversion of said liquid stock into polymer is at least about 70%.

8. The method of continuous polymerization as set forth in claim 1, wherein said liquid stock includes at least one ingredient selected from the group consisting of ethylene oxide and vinyl chloride.

9. The method of continuous polymerization as set forth in claim 1, wherein said liquid stock includes at least one of dibutyl etherate, boron trifluoride, phosphorous pentafluoride, tin tetrachloride, perchloric acids or salts thereof.

10. The method of continuous polymerization is set forth in claim 1, wherein said liquid stock includes methylal.

* * * * *